(12) United States Patent
Gustof et al.

(10) Patent No.: US 12,555,380 B2
(45) Date of Patent: Feb. 17, 2026

(54) DEVICE AND METHOD FOR MODIFYING WORKFLOWS ASSOCIATED WITH PROCESSING AN INCIDENT SCENE IN RESPONSE TO DETECTING CONTAMINATION OF THE INCIDENT SCENE

(71) Applicant: MOTOROLA SOLUTIONS, INC., Chicago, IL (US)

(72) Inventors: Grzegorz Gustof, Myslenice (PL); Lukasz Osuch, Pszczyna (PL); Marcin Kalinowski, Cracow (PL); Daniel Seals, Covington, GA (US); Pawel Wilkosz, Wisniowa (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 468 days.

(21) Appl. No.: 17/936,055

(22) Filed: Sep. 28, 2022

(65) Prior Publication Data
US 2024/0104928 A1    Mar. 28, 2024

(51) Int. Cl.
*G06Q 50/26*      (2024.01)
*G06Q 10/0633*    (2023.01)
(Continued)

(52) U.S. Cl.
CPC ......... *G06V 20/52* (2022.01); *G06Q 10/0633* (2013.01); *G06Q 50/265* (2013.01);
(Continued)

(58) Field of Classification Search
None
See application file for complete search history.

(56) References Cited

U.S. PATENT DOCUMENTS 7,023,469 B1 *   4/2006   Olson ............... H04N 7/188
                                                348/154
9,195,866 B1    11/2015   Mehranfar et al.
(Continued)

FOREIGN PATENT DOCUMENTS

DE          60204671 T2     4/2006

OTHER PUBLICATIONS

Kraus M, Pollok T, Miller M, Kilian T, Moritz T, Schweitzer D, Beyerer J, Keim D, Qu C, Jentner W. Toward Mass Video Data Analysis: Interactive and Immersive 4D Scene Reconstruction. Sensors (Basel). Sep. 22, 2020; 20(18):5426. doi: 10.3390/s20185426. PMID: 32971822; PMCID: PMC7570841. (Year: 2020).*

(Continued)

*Primary Examiner* — Folashade Anderson
(74) *Attorney, Agent, or Firm* — Raguraman Kumaresan (57) ABSTRACT

A process of modifying workflows associated with processing an incident scene in response to detecting contamination of the incident scene. An electronic computing device obtains a first image of an incident scene at a first point in time and analyzes the first image to detect a state of evidentiary items present at the incident scene. The device obtains a second image of the incident scene at a second point in time and detects a change in the state of the evidentiary items based on a comparison of the first and second images. When it is determined that one or more persons entered or exited the incident scene during a time period between the first point in time and the second point in time, the device detects that the incident scene has been contaminated and generates a workflow modification identifying one or more actions for execution by a workflow server.

20 Claims, 6 Drawing Sheets

(51) Int. Cl.
*G06V 10/74* (2022.01)
*G06V 20/52* (2022.01)
*G06V 40/10* (2022.01)
*H04N 7/18* (2006.01)

(52) U.S. Cl.
CPC .............. *G06V 10/74* (2022.01); *G06V 40/10* (2022.01); *H04N 7/181* (2013.01)

(56) References Cited

U.S. PATENT DOCUMENTS

| | | | |
|---|---|---|---|
| 9,881,085 | B2 | 1/2018 | Tan |
| 11,568,724 | B2* | 1/2023 | Koprowski ............... H04N 7/18 |
| 2012/0020518 | A1* | 1/2012 | Taguchi ................. G06T 7/292 |
| | | | 382/103 |
| 2012/0318866 | A1* | 12/2012 | McIntyre ............... G06Q 50/18 |
| | | | 235/385 |
| 2013/0027550 | A1* | 1/2013 | Evangelio ............... G06T 7/254 |
| | | | 348/143 |
| 2013/0194437 | A1* | 8/2013 | Osman ............. H04N 21/41407 |
| | | | 348/207.1 |
| 2013/0259447 | A1 | 10/2013 | Sathish et al. |
| 2015/0002267 | A1* | 1/2015 | Roys ..................... G06Q 10/06 |
| | | | 340/5.81 |
| 2015/0012396 | A1* | 1/2015 | Puerini .............. G06Q 10/0875 |
| | | | 705/28 |
| 2015/0103178 | A1* | 4/2015 | Itoh ........................ G06V 20/41 |
| | | | 348/159 |
| 2016/0171875 | A1* | 6/2016 | Nakfour ................ H04W 76/50 |
| | | | 340/691.6 |
| 2019/0266559 | A1* | 8/2019 | High .................. G06Q 10/0834 |
| 2020/0311731 | A1* | 10/2020 | Maxilom .................. G07F 7/06 |
| 2021/0004907 | A1* | 1/2021 | Hwang .................. G06Q 40/06 |
| 2021/0176317 | A1* | 6/2021 | Yeoh ...................... G06F 40/20 |
| 2021/0398659 | A1 | 12/2021 | Sharma et al. |

OTHER PUBLICATIONS

J. Sevcik, M. Adamek and V. Mach, "Crime Scene Testimony in Virtual Reality Applicability Assessment," 2022 26th International Conference on Circuits, Systems, Communications and Computers (CSCC), Crete, Greece, 2022, pp. 6-10, doi: 10.1109/CSCC55931.2022.00010. (Year: 2022).*

M. Umair, A. Bouguettaya, and A. Lakhdari, "Detecting Changes in Crowdsourced Social Media Images" Oct. 23, 2023, arXiv: 2310.16848 [cs.SI] (Year: 2023).*

Umair (Year: 2023).*
Huang (Year: 2008).*
Kraus (Year: 2020).*

* cited by examiner

DEVICE AND METHOD FOR MODIFYING WORKFLOWS ASSOCIATED WITH PROCESSING AN INCIDENT SCENE IN RESPONSE TO DETECTING CONTAMINATION OF THE INCIDENT SCENE

BACKGROUND

When an incident is reported, public safety professionals including first responders, crime-scene investigators, medical examiners, evidence specialists etc., show up at an incident scene and work together to process the incident scene. Securing the incident scene, interviewing the witnesses, documenting the incident scene in detail, and collecting physical evidence are some of the essential functions performed during processing of the incident scene. Documenting the incident scene also involves photographing the crime scene and noting the items found at the incident scene. As some of the items found at the incident scene may have an evidentiary value, it is crucial to track the state of the items found at the incident scene at different points in time during processing of the incident scene and more particularly to detect if any change in the state of the evidentiary items found at the incident scene is caused by persons assigned to process the incident scene.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

As described above, it is important to track the state of the items found at an incident scene at different points in time as officers process the incident scene. An incident scene may be said to be contaminated whenever a change in the state of the items (e.g., changes with respect to a position, shape, or orientation of the items, or an item initially found at the scene altogether missing from the scene at a later point) found at the incident scene is particularly correlated to one or more persons who entered or exited the incident scene during a time period when the change of state was detected. In such a situation when contamination of the incident scene has been detected, it is important to modify existing workflows associated with processing the incident scene and further implement post-contamination actions. Accordingly, disclosed below is an improved system and process for modifying workflows associated with processing an incident scene in response to detecting contamination of the incident scene.

One embodiment provides a method for modifying workflows associated with processing an incident scene in response to detecting contamination of the incident scene. The method comprises: obtaining, at an electronic computing device, a first image captured corresponding to the incident scene at a first point in time; analyzing, at the electronic computing device, the first image to detect a state of one or more evidentiary items present at the incident scene; obtaining, at the electronic computing device, a second image captured corresponding to the incident scene at a second point in time; detecting, at the electronic computing device, a change in the state of the one or more evidentiary items based on a comparison of the first image with the second image; determining, at the electronic computing device, in response to detecting the change in the state of the one or more evidentiary items, whether one or more persons entered or exited the incident scene during a time period between the first point in time and the second point in time; detecting, at the electronic computing device, that the incident scene has been contaminated when it is determined that one or more persons entered or exited the incident scene during the time period between the first point in time and the second point in time; generating, at the electronic computing device, in response to detecting that the incident scene has been contaminated, a workflow modification identifying one or more actions to be added to an existing workflow associated with processing the incident scene; and providing, at the electronic computing device, an electronic notification including the workflow modification for execution by a workflow server.

Another embodiment provides an electronic computing device, comprising a communications unit and an electronic processor communicatively coupled to the communications unit. The electronic processor is configured to: obtain, via the communications unit, a first image captured corresponding to an incident scene at a first point in time; analyze the first image to detect a state of one or more evidentiary items present at the incident scene; obtain, via the communications unit, a second image captured corresponding to the incident scene at a second point in time; detect a change in the state of the one or more evidentiary items based on a comparison of the first image with the second image; determine, in response to detecting the change in the state of the one or more evidentiary items, whether one or more persons entered or exited the incident scene during a time period between the first point in time and the second point in time;

detect, at the electronic computing device, that the incident scene has been contaminated when it is determined that one or more persons entered or exited the incident scene during the time period between the first point in time and the second point in time; generate, in response to detecting that the incident scene has been contaminated, a workflow modification identifying one or more actions to be added to an existing workflow associated with processing the incident scene; and provide an electronic notification including the workflow modification for execution by a workflow server.

Each of the above-mentioned embodiments will be discussed in more detail below, starting with example system and device architectures of the system in which the embodiments may be practiced, followed by an illustration of processing blocks for achieving an improved technical method, device, and system for modifying workflows associated with processing an incident scene in response to detecting contamination of the incident scene. Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

Figure 1:
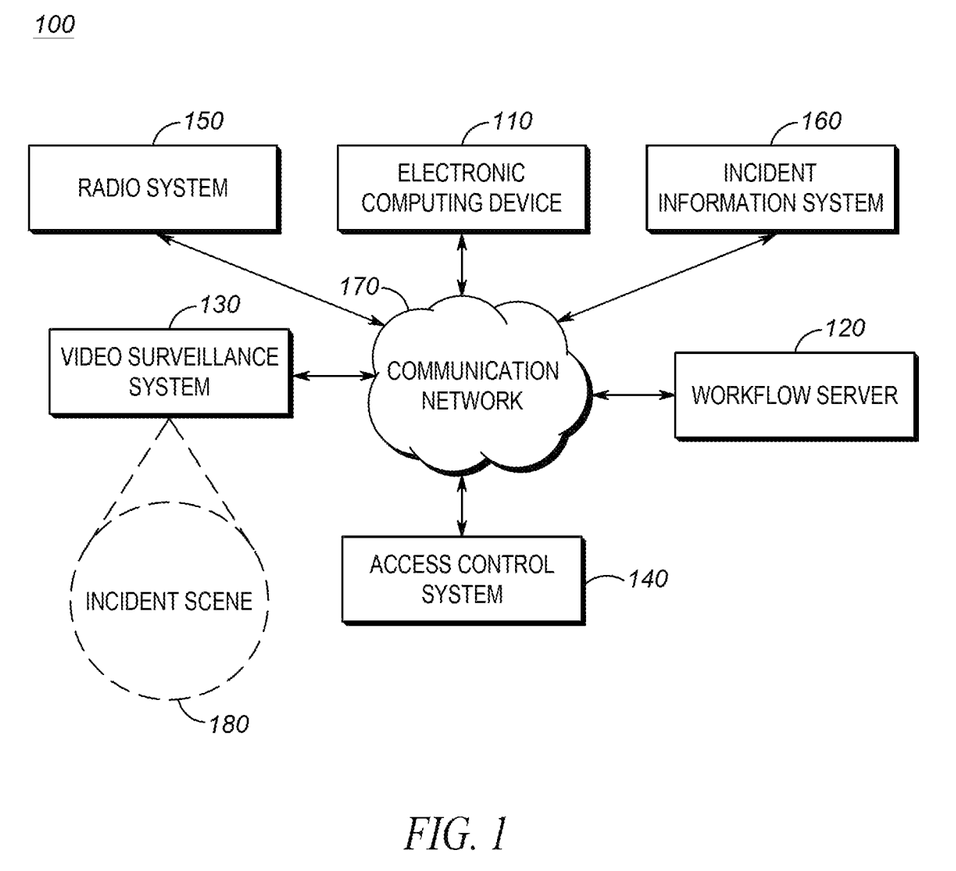
FIG. 1 is a block diagram of a system in accordance with some embodiments.

Referring now to the drawings, and in particular FIG. 1 illustrates a system 100 comprising an electronic computing device 110, a workflow server 120, a video surveillance system 130, an access control system 140, a radio system 150, an incident information system 160, and a communication network 170. An electronic computing device 110 includes any computer configured to detect contamination of an incident scene 180 and further modify workflows associated with processing the incident scene 180 in response to detecting the contamination of the incident scene 180. In one embodiment, the electronic computing device 110 may execute Motorola Solutions' Orchestrate™ and Ally™ dispatch and incident management software. As will be discussed in more detail below, the electronic computing device 110 is configured to present a user (e.g., via an electronic display) with one or more triggers indicating detection of contamination of an incident scene 180) as well as present the user with a workflow modification identifying one or more recommended actions to be added to an existing workflow associated with processing an incident scene 180. If the user approves the workflow modification, the electronic computing device 110 then generates and uploads these workflows to the workflow server 120 based on the presented triggers and actions.

The workflow server 120 may include a computer server configured to receive workflow modifications generated by the electronic computing device 110 and execute the actions included in the workflows. In one embodiment, the workflow server 120 runs Motorola Solutions' Command Central™ software suite comprising the Orchestrate™ platform. In accordance with some embodiments, the workflows modifications are particularly implemented and corresponding actions are executed by the workflow server 120 in response to receiving an electronic notification from the electronic computing device 110 indicating that the incident scene 180 has been contaminated by one or more persons who are identified to have entered or exited the incident scene 180 during a given time period when a state of one or more evidentiary items found at the incident scene 180 has changed. For example, in response to a triggering event indicating contamination of the incident scene 180, the electronic computing device 110 may automatically generate an workflow action which comprises notifying a communication device operated by a supervisor of the person who is identified to have entered or exited the incident scene 180 at a particular time period during which there was a change in the state of one or more evidentiary items found at the incident scene 180. When the workflow action is uploaded to the workflow server 120, the workflow server 120 will execute the corresponding action. As an example, the workflow server 120 may execute a workflow action to automatically provide an electronic notification to a communication device operated by a supervisor (e.g., incident commander) indicating that the incident scene 180 has been contaminated and that one or more persons reporting to the supervisor is likely responsible for the contamination of the incident scene 180.

The video surveillance system 130 includes one or more cameras that are configured to capture images corresponding to its field-of-view, for example, an area overlapping the incident scene 180 at different points in time. The cameras may include surveillance cameras, vehicle cameras, body-worn cameras, mobile device cameras, drone cameras, etc., that were either deployed at the incident scene 180 in response to an incident being reported at the incident scene 180 or were deployed near the incident scene 180 prior to the occurrence of the incident for surveillance purposes. As used herein, the term "incident" may refer to an event, occurrence, or situation (e.g., a traffic accident, a crime scene, public disturbance, medical emergency, fire, broken water meter or power line, etc.) that one or more public-safety agencies (e.g., police, fire, emergency medical service) have been tasked to resolve. Further, the term "incident scene" refers to an indoor or outdoor area where the incident is reported to have occurred. In one embodiment, the electronic computing device 110 and/or the workflow server 120 are configured to control the cameras to automatically change their field of views over time. As an example, in response to detecting contamination of the incident scene 180, the electronic computing device 110 may generate a workflow action which is executed by the workflow server 120 to control one or more cameras deployed at the incident scene 180 to automatically change its field-of-view to track the state of one or more evidentiary items found at the incident scene 180. In accordance with some embodiments, the electronic computing device 110 and/or the video surveillance system 130 is configured with a recognition engine/video analysis engine (VAE) that comprises a software engine that analyzes any image (still or moving images) captured by the cameras. The VAE may be programmed with a detection or recognition classifier that evaluates the image captured by a camera and detects activity of interest including the presence or absence of one or more evidentiary items (e.g., wallets, bullets, firearms, blood, furniture, appliances, persons, or any other objects) at the incident scene 180. In accordance with embodiments, the VAE may be additionally programmed to recognize a state of the evidentiary items found at the incident scene 180. The state of the evidentiary items may represent, for example, a position, a shape, a color, an orientation, a presence or absence, or other visual characteristics of an evidentiary item found at the incident scene 180. In accordance with embodiments, the electronic computing device 110 may use the VAE to detect a trigger indicating a change in the state of one or more evidentiary objects found at the incident scene 180 and also further detect contamination of the incident scene 180. In one embodiment, the video surveillance system 130 comprises an Avigilon™ Control Center (ACC) server having Motorola Solutions' Access Control Management (ACM)™ software suite.

The access control system 140 comprises an IoT network that serves to connect every-day devices to the Internet. Devices such as cars, kitchen appliances, medical devices, sensors, doors, windows, HVAC systems, drones, etc., can all be connected through the IoT. Basically, anything that can be powered can be connected to the internet to control its functionality. The access control system 140 allows objects to be sensed or controlled remotely across existing network infrastructure. For example, the access control system 140 may be configured to provide access control to various doors and windows. With this in mind, the access control system 140 is configured to detect various triggers (e.g., door opened/closed at the incident scene 180) and report the detected triggers to the electronic computing device 110. In one embodiment, the electronic computing device may use the access control system 140 to determine if one or more persons have entered or exited the incident scene 180 during a particular time period when there was a detected change in the state of one or more evidentiary items present at the incident scene 180. The access control system 140 is also configured to receive action commands from the workflow server 120 and execute the action received from workflow server 120. The action commands may take the form of instructions to lock, open, and/or close a door or window at the incident scene 180. As an example, the electronic computing device 110, upon identifying one or more persons as likely responsible for the contamination of the incident scene 180, may generate a workflow action requiring the access control system 140 to restrict the one or more persons from further accessing an entry door at the incident scene 180. The workflow server 120 then executes the workflow action in coordination with the access control system 140 to restrict access to the entry door at the incident scene 180 by the one or more persons.

The radio system 150 may comprise a private enterprise radio that is configured to receive action commands from the workflow server 120 and execute the actions. As an example, the electronic computing device 110, upon detecting that the incident scene 180 has been contaminated, may generate a workflow action requiring the workflow server 120 to notify a supervisor (e.g., incident commanders) of one or more persons identified as likely responsible for the contamination of the incident scene 180. In response, the workflow server 120 may execute the workflow action by providing an electronic notification to a communication device (e.g., portable radio) operated by the supervisor indicating the contamination of the incident scene 180 as well as further including information identifying the one or more persons as likely responsible for the contamination of the incident scene 180. As another example, the electronic computing device 110, upon detecting that the incident scene 180 has been contaminated, may generate a workflow action requiring the workflow server 120 to provide an electronic notification to the radio system 150 to request the radio system 150 to activate location tracking in radio devices operated by one or more persons identified as likely responsible for the contamination of the incident scene 180. In one embodiment, the radio system 150 comprises a MOTOTRBO™ communication system having radio devices that operate in the CBRS spectrum and combines broadband data with voice communications.

In accordance with some embodiments, the electronic computing device 110 has access to an incident information system 160 that maintains information (e.g., type of incident, severity of incident, incident location etc.) related to a reported incident and one or more public-safety officers assigned to process an incident scene 180 associated with the reported incident. As an example, when an incident occurs, a caller at the incident scene 180 may make an emergency call to report the incident. An operator at a public safety answering point (not shown) may answer the emergency call and gather information about the incident. In response, a computer aided dispatch (CAD) computer (not shown) connected to the public safety answering point, automatically or in response to an input from the operator, assigns an incident identifier (e.g., a computer aided dispatch (CAD) identifier) to the incident reported by the caller and further assigns/dispatches one or more public-safety officers to respond to or investigate the incident scene 180 based on one or more of the type of incident, severity of incident, and incident location. In any case, the information gathered from the caller and responder information identifying officers assigned to process the incident scene 180 are stored at the incident information system 160 and can be accessed by the electronic computing device 110. In some cases, the incident information system 160 may include information related to persons (e.g., name, role, and affiliated agency) who entered the incident scene 180 to process the evidentiary items found at the incident scene 180. The information may also include timestamp information indicating a time at which the persons entered or exited the incident scene. The electronic computing device 110 may use the timestamp information to identify particular persons who were present at the incident scene 180 during a time period when there was a change in the state of one or more evidentiary items found at the incident scene 180.

As is evident from the above description, the electronic computing device 110 may automatically generate and modify rule-based workflows in response to identifying one or more persons as likely responsible for the contamination of an incident scene 180. The automated workflows enhance efficiency, and improve response times, effectiveness, and overall safety. The system 100 has the capabilities to detect triggers across a number of devices operating within the communication network 170 and to quickly take actions by automatically executing the actions once a trigger is detected.

The electronic computing device 110, the workflow server 120, the video surveillance system 130, the access control system 140, the radio system 150, and the incident information system 160 communicate with one another via the communication network 170. The communication network 170 comprises one of many networks used to transmit data, such as but not limited to a network employing one of the following protocols: a Long Term Evolution (LTE) protocol, LTE-Advance protocol, or 5G protocol including multimedia broadcast multicast services (MBMS) or single site point-to-multipoint (SC-PTM) protocol over which an open mobile alliance (OMA) push to talk (PTT) over cellular protocol (OMA-PoC), a voice over IP (VoIP) protocol, an LTE Direct or LTE Device to Device protocol, or a PTT over IP (PoIP) protocol, a Wi-Fi protocol perhaps in accordance with an IEEE 802.11 standard (e.g., 802.11a, 802.11b, 802.11g) or a WiMAX protocol perhaps operating in accordance with an IEEE 802.16 standard.

While only one electronic computing device 110, workflow server 120, video surveillance system 130, access control system 140, radio system 150, incident information system 160 and communication network 170 are shown in FIG. 1 for illustrative purposes, the system 100 may be implemented using any number of electronic computing devices, workflow servers, video surveillance systems, access control systems, radio systems, and communication networks.

Figure 2:
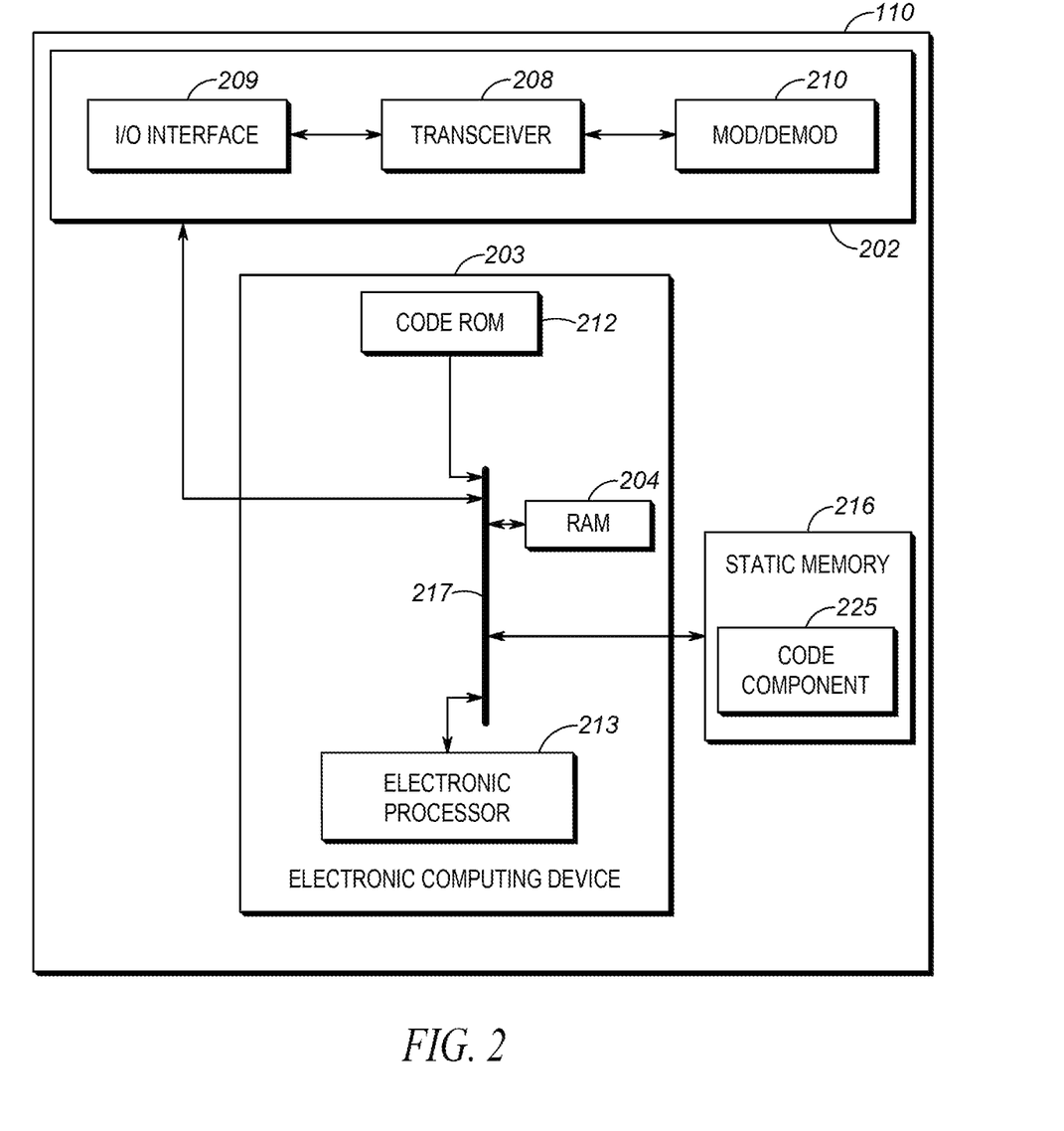
FIG. 2 is a block diagram of an electronic computing device shown in FIG. 1 in accordance with some embodiments.

FIG. 2 is an example functional block diagram of an electronic computing device 110 operating within the system 100 in accordance with some embodiments. The electronic computing device 110 may be embodied in computing devices not illustrated in FIG. 1, and/or may be a distributed computing device across two or more of the foregoing (or multiple of a same type of one of the foregoing) and linked via a wired and/or wireless communication link(s). While FIG. 2 represents an electronic computing device 110 described above with respect to FIG. 1, depending on the type of server, the electronic computing device 110 may include fewer or additional components in configurations different from that illustrated in FIG. 2. In one embodiment, one or more functionalities of one or more of the workflow server 120, video surveillance system 130, access control system 140, radio system 150, and incident information system 160 are implemented at the electronic computing device 110. As an example, a function performed at the workflow server 120 to update a workflow modification in an existing workflow and to further execute one or more actions included in the workflow modification can be implemented at the electronic computing device 110.

As shown in FIG. 2, the electronic computing device 110 includes a communications unit 202 (also referred to as a "communication interface") coupled to a common data and address bus 217 of a processing unit 203. The communications unit 202 sends and receives data to and from other devices in the system 100. The communications unit 202 may include one or more wired and/or wireless input/output (I/O) interfaces 209 that are configurable to communicate with other devices in the system 100. For example, the communications unit 202 may include one or more wireless transceivers 208, such as a DMR transceiver, a P25 transceiver, a Bluetooth transceiver, a Wi-Fi transceiver perhaps operating in accordance with an IEEE 802.11 standard (for example, 802.11a, 802.11b, 802.11g), an LTE transceiver, a WiMAX transceiver perhaps operating in accordance with an IEEE 802.16 standard, and/or another similar type of wireless transceiver configurable to communicate via a wireless radio network. The communications unit 202 may additionally or alternatively include one or more wireline transceivers 208, such as an Ethernet transceiver, a USB transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The processing unit 203 may include an encoder/decoder with a code Read Only Memory (ROM) 212 coupled to the common data and address bus 217 for storing data for initializing system components. The processing unit 203 may further include an electronic processor 213 (for example, a microprocessor, a logic circuit, an application-specific integrated circuit, a field-programmable gate array, or another electronic device) coupled, by the common data and address bus 217, to a Random Access Memory (RAM) 204 and a static memory 216. The electronic processor 213 may generate electrical signals and may communicate signals through the communications unit 202.

Figure 3:
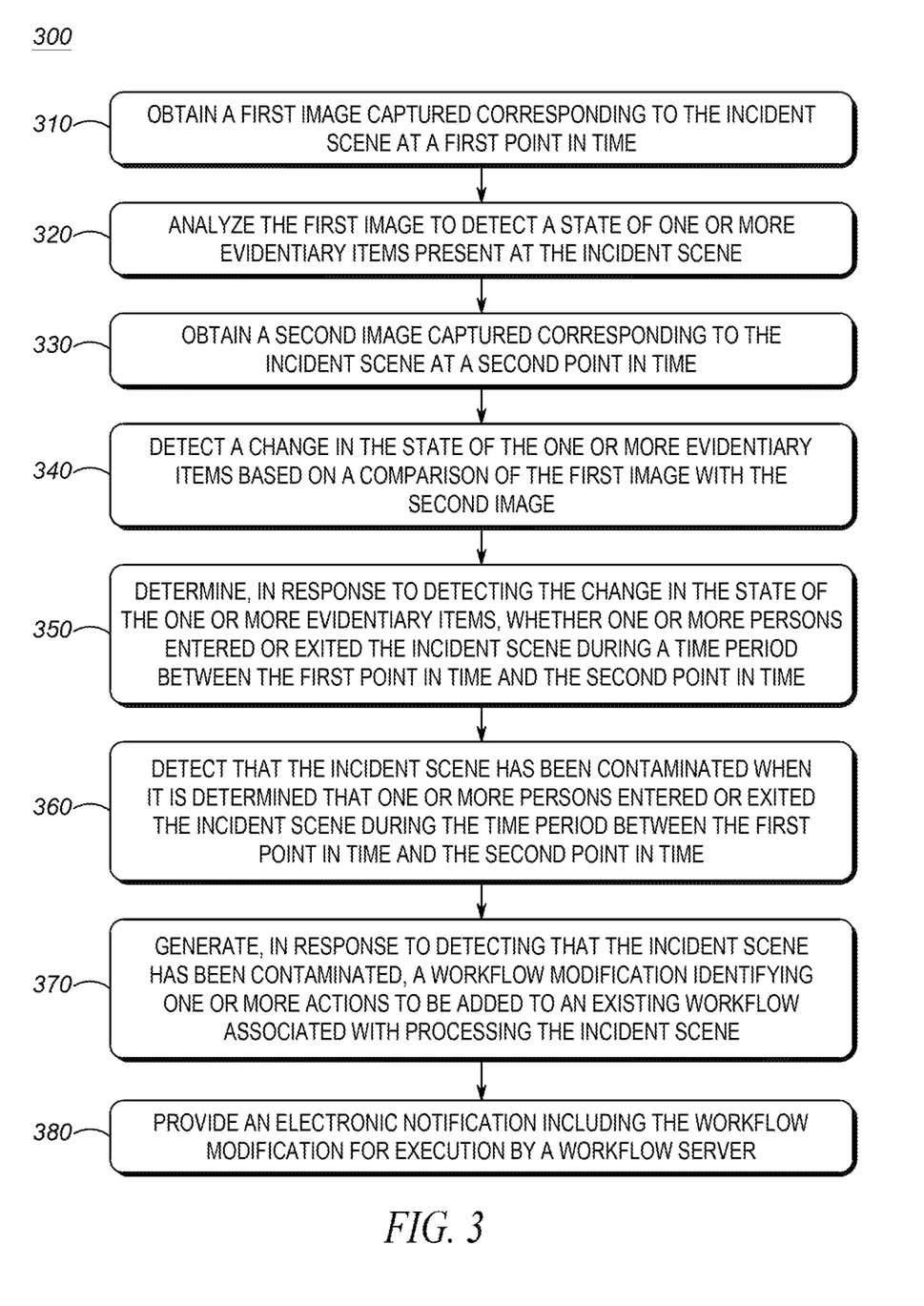
FIG. 3 illustrates a flowchart of a process for modifying workflows associated with processing an incident scene in response to detecting contamination of the incident scene in accordance with some embodiments.

Static memory 216 may store operating code 225 for the electronic processor 213 that, when executed, performs one or more of the blocks set forth in FIG. 3 and the accompanying text(s). The static memory 216 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, and the like. The static memory 216 may further store information needed for the electronic computing device 110 to: detect a change in the state of one or more evidentiary items found at an incident scene 180; determine whether one or more persons entered or exited the incident scene 180; detect that the incident scene 180 has been contaminated; generate a workflow modification identifying one or more actions to be added to an existing workflow associated with processing the incident scene 180; and provide an electronic notification including the workflow modification for execution by the workflow server 120.

Turning now to FIG. 3, a flowchart diagram illustrates a process 300 for modifying workflows associated with processing an incident scene 180 in response to detecting contamination of the incident scene 180. While a particular order of processing steps, message receptions, and/or message transmissions is indicated in FIG. 3 as an example, timing and ordering of such steps, receptions, and transmissions may vary where appropriate without negating the purpose and advantages of the examples set forth in detail throughout the remainder of this disclosure. An electronic computing device 110 shown in FIG. 1 and/or FIG. 2, and embodied as a singular computing device or distributed computing device may execute process 300 via an electronic processor 213.

The electronic computing device 110 may execute the process 300 at power-on, at some predetermined periodic time period thereafter, in response to a trigger raised locally at the electronic computing device 110 via an internal process or via an input interface or in response to a trigger from an external system (e.g., video surveillance system 130, access control system 140, radio system 150, incident information system 160) to which the electronic computing device 110 is communicably coupled, among other possibilities. As an example, the electronic computing device 110 is programmed to automatically trigger execution of the process 300 in response to receiving a notification indicating that an incident has been reported at an incident scene 180 or a notification indicating dispatch of one or more public-safety officers to the incident scene 180.

The process 300 of FIG. 3 need not be performed in the exact sequence as shown and likewise various blocks may be performed in different order or alternatively in parallel rather than in sequence. The process 300 may be implemented on variations of the system 100 of FIG. 1 as well.

Figure 4A:
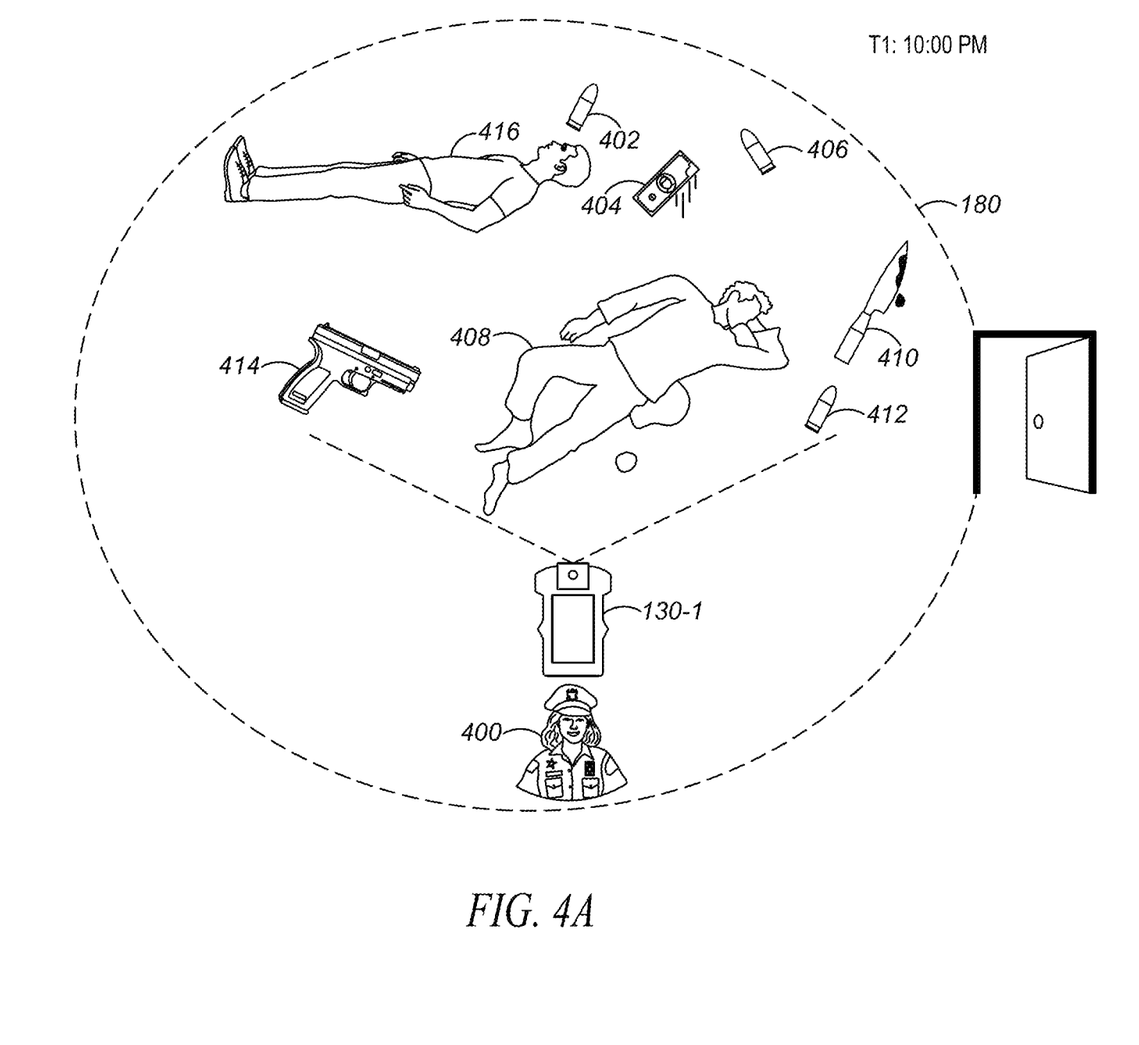
FIGS. 4A-4C illustrate an example scenario in which the embodiments described herein can be advantageously implemented for modifying workflows associated with processing an incident scene in response to detecting contamination of the incident scene.
Figure 4B:
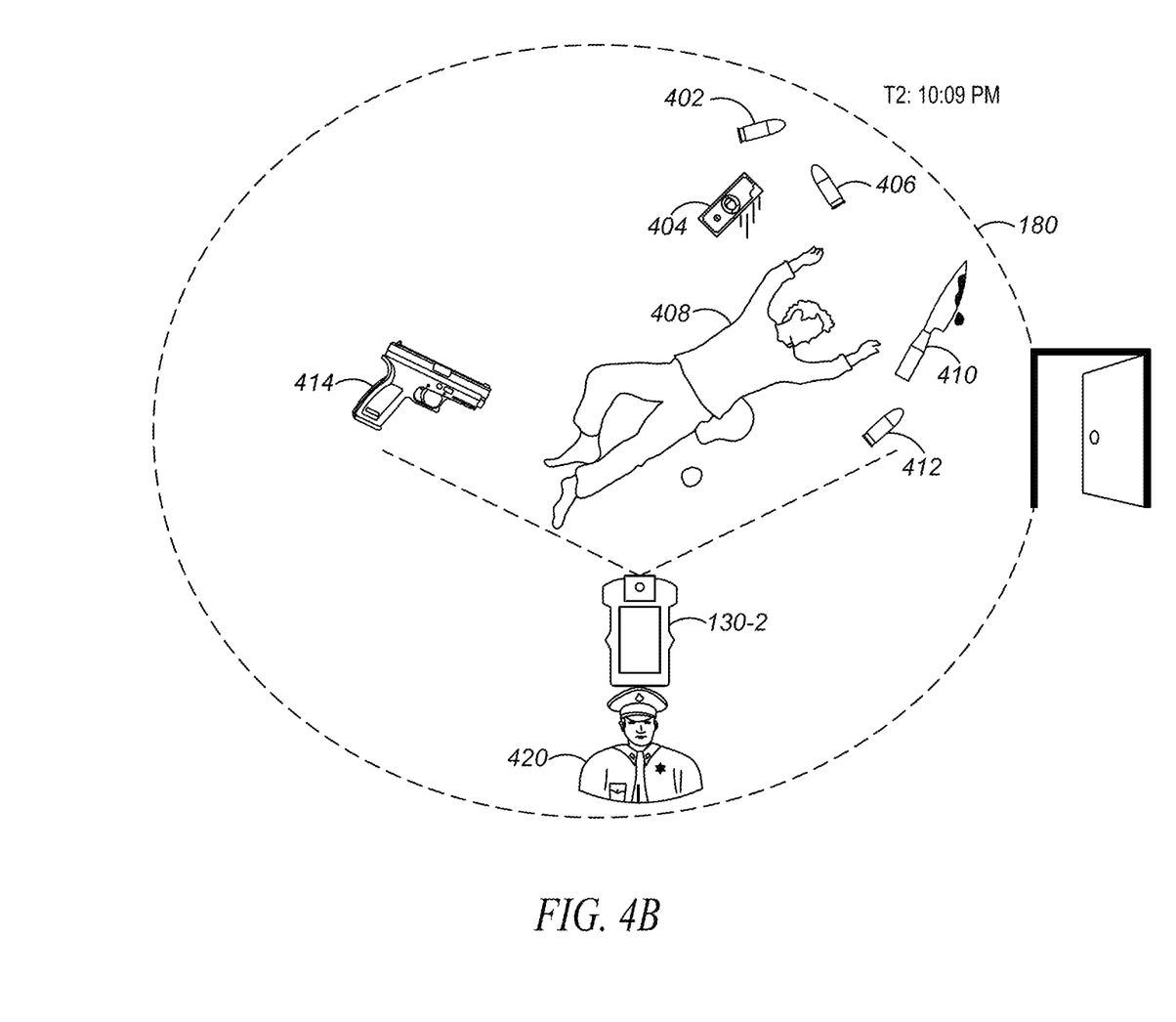
Figure 4C:
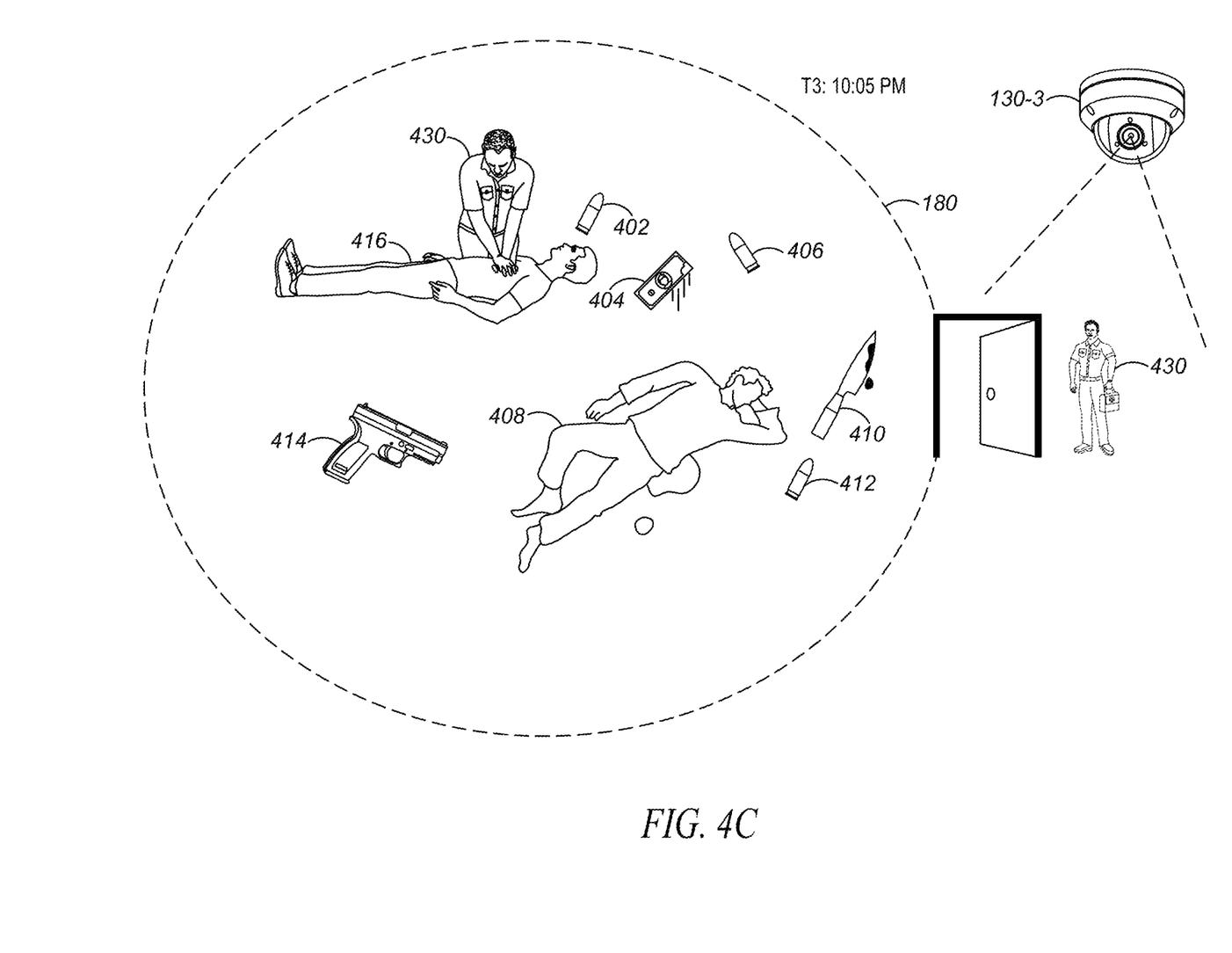

The process 300 will be described below with reference to the example scenarios shown in FIGS. 4A-4C. FIG. 4A shows a snapshot of an incident scene 180 captured at time T1 (e.g., 10:00 AM) when a police officer 400 arrives at the incident scene 180 to respond to an incident (e.g., an incident involving an active shooter situation with multiple injured/deceased persons 408, 416). FIG. 4B shows a snapshot of the same incident scene 180 captured at time T2 (e.g., 10:09 AM) when a crime scene investigator 420 arrives at the incident scene 180 to investigate and document the incident scene 180. FIG. 4C shows a snapshot of the same incident scene captured at time T3 (e.g., 10:05 AM) which is between time T1 and T2 when an emergency medical personnel 430 arrives at the incident scene 180 to examine the injured persons at the incident scene 180 and to shift them to a hospital for further examination or treatment. Assume that, at time T3, the emergency medical personnel 430 potentially contaminated one or more evidentiary items (e.g., bullet 402) present at the incident scene 180. Described below is a process 300 that provides for: detecting contamination of evidentiary items at an incident scene 180; identifying person(s) who likely contributed to the contamination of the incident scene 180 based on their presence at the incident scene 180 during a time period when the contamination was detected; identifying one or more actions to be added to an existing workflow associated with processing the incident scene 180; and providing an electronic notification including the workflow modification for execution by the workflow server 120.

At block 310, the electronic computing device 110 obtains a first image captured corresponding to the incident scene 180 at a first point in time. Referring to the example illustrated in FIG. 4A, an image corresponding to the incident scene 180 captured by a body-worn camera 130-1 operated by an officer 400 is shown. The officer 400 may represent a public-safety officer such as a police officer assigned to process (e.g., respond to an active incident situation) the incident scene 180. In this example, the body-worn camera 130-1 operated by the officer 400 may automatically (or in response to the activation of the camera 130-1 by the officer 400) may capture an image of the incident scene 180 and may further upload this image along with a timestamp indicating a time (e.g., T1: 10.00 AM) at which the image was captured to the incident information system 160. The incident information system 160 may in turn forward the image along with the timestamp to the electronic computing device 110. In accordance with some embodiments, the body-worn camera 130-1 operated by the officer 400 may be programmed to automatically capture an image of the incident scene 180 at periodic time intervals or whenever there is a substantial change in the field-of-view of the body-worn camera 130-1. In accordance with some embodiments, an existing workflow action implemented by the workflow server 120 may require all cameras (e.g., body-worn cameras worn by officers entering the incident scene 180, pre-deployed surveillance cameras, vehicle cameras etc.) deployed at the incident scene 180 to periodically capture images corresponding to the incident scene 180 and to further provide the images along with the time of capture to the electronic computing device, for example, via the incident information system 160. Similarly, there may exist a policy that requires any officer entering the incident scene 180 to have their body-worn camera turned on at all times during their presence at the incident scene 180. In one embodiment, the electronic computing device 110 is configured to receive images of the incident scene 180 in real-time i.e., substantially at the same time the image is captured by one or more cameras at the incident scene 180. In other embodiments, the electronic computing device 110 is programmed to receive images captured corresponding to the incident scene 180 only after the processing of the incident scene 180 has been completed (e.g., after the evidentiary items are cleared from the incident scene 180).

At block 320, the electronic computing device 110 analyzes the first image to detect a state of one or more evidentiary items found at the incident scene 180. In accordance with some embodiments, the electronic computing device 110 uses the VAE to analyze the first image and detect a state of evidentiary items present at the incident scene 180 at the first point in time. For example, in the example shown in FIG. 4A, the electronic computing device 110 may detect the presence of evidentiary items such as bullets 402, 406, 412, cash 404, persons 408, 416, firearm 414, and knife 410. The electronic computing device 110 may further detect a state of the different evidentiary items found at the incident scene 180. As an example, the state of the evidentiary items may represent one or more combinations of: a position, a shape, a color, an orientation, a presence or absence, or other visual characteristics of an evidentiary item found at the incident scene 180. In the example shown in FIG. 4A, the electronic computing device 110 may store information (e.g., at the static memory 216) identifying the type of evidentiary items (e.g., bullet 402, knife 410, cash 404, firearm 414, persons 408, 416 etc.) that were found at the incident scene 180 along with the state information (e.g., information indicating relative positions or orientations of the bullets 402, 406, 412).

At block 330, the electronic computing device 110 obtains a second image captured corresponding to the incident scene 180 at a second point in time. Referring to the example illustrated in FIG. 4B, an image corresponding to the incident scene 180 captured by a body-worn camera 130-2 operated by an officer 420 is shown. The officer 420 may represent a public-safety officer such as a crime scene investigator assigned to process the incident scene 180. In this example, the body-worn camera 130-2 operated by the officer 420 may automatically (or in response to be activated by the officer 420) may capture an image of the incident scene 180 and may further upload this image along with a timestamp indicating a time (e.g., T2: 10.09 AM) at which the image was captured to the incident information system 160. The incident information system 160 may in turn forward the image along with the time of capture to the electronic computing device 110. In accordance with some embodiments, the body-worn camera 130-2 operated by officer 420 may be programmed to automatically capture an image of the incident scene 180 at periodic time intervals or whenever there is a substantial change in the field-of-view of the body-worn camera 130-2.

At block 340, the electronic computing device 110 compares the first image with the second image and detects that there is a change in the state of one or more evidentiary items found at the incident scene 180. In accordance with some embodiments, the electronic computing device 110 uses the VAE to analyze the second image and detect a state of the evidentiary items at the second point in time. For example, in the example shown in FIG. 4B, the electronic computing device 110 may detect the type of evidentiary items such as bullets 402, 406, 412, cash 404, person 416, firearm 414, and knife 410. The electronic computing device 110 may further detect a state of the different evidentiary items present at the incident scene 180 at the second point in time. As an example, the state of the evidentiary items may represent one or more of: a position, a shape, a color, an orientation, a presence or absence, or other visual characteristics of an evidentiary item found at the incident scene 180. In the example shown in FIG. 4B, the electronic computing device 110 may store information (e.g., at the static memory 216) identifying the type of evidentiary items (e.g., bullet 402, knife 410, cash 404, firearm 414, person 408) that were found at the incident scene 180 along with state information (e.g., information indicating relative positions or orientations of the bullets 402, 406, 412).

In accordance with some embodiments, the electronic computing device 110 compares the information (i.e., state and type of evidentiary items present at the incident scene 180 at the first point in time) extracted from the first image with the information (i.e., state and type of evidentiary items present at the incident scene 180 at the second point in time) extracted from the second image. In the example shown in FIG. 4B, the electronic computing device 110 may detect that the bullet 402 has changed its position as well as orientation during a time period between the first point in time (T1) and the second point in time (T2). The electronic computing device 110 may also detect that the person 416 who was appearing in the first image at the first point in time is missing in the second image captured at the second point in time. The electronic computing device 110 may further detect that the hand of the person 408 has changed its position during a time period between the first point in time and the second point in time. The electronic computing device 110 then stores information (e.g., at the static memory 216) identifying the evidentiary items (e.g., bullet 402, person 408, person 416) corresponding to which a change of state was detected during a time period between the first point in time and second point in time. The information also further identifies a state parameter (e.g., position, orientation, color, presence or absence) indicating how the evidentiary items have changed their state and a time period (e.g., between 10:00 AM and 10:09 AM) during which a change of state was detected. In one embodiment, the electronic computing device 110 compares the images as they are received from the video surveillance system 130 in real-time to detect if there is any change in the state of one or more evidentiary items found at the incident scene 180.

At block 350, the electronic computing device 110, in response to detecting the change in the state of the one or more evidentiary items, determines whether one or more persons entered or exited the incident scene 180 during a time period between the first point in time and the second point in time. In accordance with embodiments, the electronic computing device 110 obtains information from one or more of the video surveillance system 130, access control system 140, radio system 150, and incident information system 160 to determine whether one or more persons entered or exited the incident scene 180 during a particular time period (e.g., a time period between the first point in time and the second point in time) when there was a detected change in the state of the one or more evidentiary items. As an example, the electronic computing device 110 may request the video surveillance system 130 (e.g., video surveillance camera 130-3 shown in FIG. 4C) to send images captured corresponding to the incident scene 180 (but not previously received by the electronic computing device 110) during a particular time period between the first point in time and the second point in time. In response, if the electronic computing device 110 receives any image captured corresponding to the incident scene 180 during the particular time period, then the electronic computing device 110 analyzes the image using the VAE to identify persons who entered or exited the incident scene 180 during the particular time period. As another example, the electronic computing device may request the access control system 140 for information regarding persons who gained access to an entry door at the incident scene 180. The electronic computing device 110 then identifies persons who entered the incident scene 180 during the particular time period based on information received from the access control system 140 regarding persons who accessed the entry door at the incident scene 180 during the particular time period. As another example, the electronic computing device 110 may request the incident information system 160 to provide information regarding officers who were dispatched to the incident scene 180 as well as their time of entry and exit at the incident scene 180. The electronic computing device 110 then uses the information received from the incident information system 160 to identify persons who entered or exited the incident scene 180 during the particular time period. As a further example, the electronic computing device 110 may request the radio system 150 to provide information about users of radio devices which were present at a location of the incident scene 180 during the particular time period. The electronic computing device 110 then uses the location information and corresponding user presence information received from the radio system 150 to identify persons who entered or exited the incident scene 180 during the particular time period.

At block 360, the electronic computing device 110 detects that the incident scene 180 has been contaminated when it is determined that one or more persons entered or exited the incident scene 180 during the time period between the first point in time and the second point in time. In FIG. 4C, an example of an image captured corresponding to the incident scene 180 at a third point in time (T3: 10:05 AM) between the first point in time (T1: 10:00 AM) and second point in time (T2: 10:09 AM) is shown. In this example, the electronic computing device 110 may analyze the image using the VAE to determine that an officer 430 (e.g., a paramedic) entered the incident scene 180 to treat the injured person 416 during a time period between T1 and T2. In this example, the electronic computing device 110 may identify the officer 430 as likely responsible for the contamination of the incident scene 180 based on the officer's presence at the incident scene and the change in the position/orientation of bullet 402, the change in the position of the hand of the person 416, and the person 416 being missing in the second image.

In accordance with some embodiments, the electronic computing device 110 determines that a person is likely responsible for contaminating the incident scene 180 based not only on the person's presence at the incident scene 180 during a time period when the change of state of evidentiary items was detected, but also based on additional information such as the role assigned to the person in connection with processing the incident scene 180, historical behaviors, historical data related to contaminating items present on incident scenes etc.

In accordance with some embodiments, the electronic computing device 110 determines the identity of the one or more persons determined to have entered or exited the incident scene 180 during the time period between the first point in time and the second point in time. The electronic computing device 110 further determines a role respectively assigned to the one or more persons in connection with processing the incident scene 180. If the electronic computing device 110 determines that the role does not require the one or more persons to interact with the one or more evidentiary items at the incident scene 180, then the electronic computing device 110 concludes that the incident scene 180 has been likely contaminated by the one or more persons. In the example illustrated in FIG. 4C, the electronic computing device 110 may identify that the role of the officer 430 is paramedic and the officer's role requires the officer 430 to interact with the injured/deceased persons (e.g., persons 408, 416) at the incident scene 180. In this example, the electronic computing device 110 may further determine that the officer's 430 role does not require the officer 430 to interact with evidentiary items like bullets 402, 406, 412 present at the incident scene 180. However since there is a change in the position/orientation of the bullet 402 in the second image captured at the second point in time (as shown in FIG. 4B) when compared to the first image captured at the first point in time (as shown in FIG. 4A) and further the officer 430 was present at the incident scene 180 during a time period between the first point in time and second point in time, the electronic computing device 110 may conclude that the officer 430 is likely responsible for contaminating the incident scene 180 for causing the state of an evidentiary item such as a bullet while performing the assigned duties at the incident scene 180.

At block 370, the electronic computing device 110 generates, in response to detecting that the incident scene 180 has been contaminated, a workflow modification identifying one or more actions to be added to an existing workflow associated with processing the incident scene 180. As used herein, the term "existing workflow" represents one or more existing workflow actions to be executed by the workflow server 120 for facilitating the processing of the incident scene 180. As an example, the existing workflow may include an action to automatically control the access control system 140 to provide unrestricted access to officers authorized (e.g., by a computer aided dispatch system) to enter the incident scene 180. On the other hand, the workflow modification may include an action to automatically control the access control system 140 to restrict an officer (e.g., officer 430) from accessing the incident scene 180 in response to identifying the officer as likely responsible for contaminating the incident scene 180.

The one or more actions to be executed by the workflow server 120 may include providing, to one or more communication devices respectively operated by one or more supervisors of the one or more persons (e.g., officer 430), an electronic notification indicating that the incident scene 180 has been contaminated. The electronic notification may also further identify the officer 430 as likely responsible for contamination of the incident scene 180. The notification may also include information related to a type of the evidentiary item (e.g., bullet 402) and a particular state parameter (e.g., position, orientation) corresponding to which there was a change in the state of the evidentiary item.

In one embodiment, the electronic notification additionally includes a request for approval from the one or more supervisors to obtain a statement from the one or more persons (i.e., persons identified as likely responsible for contaminating the incident scene 180) in connection with the detected contamination of the incident scene 180. If the supervisor provides an approval, then a further workflow action may be included to automatically provide an electronic notification to a communication device (e.g., portable radio) operated by the one or more persons to submit a statement explaining the change in the state of one or more evidentiary items during their presence at the incident scene 180. The one or more actions to be executed by the workflow server 120 may further include automatically uploading the statement obtained from the one or more persons (identified as likely responsible for contaminating the incident scene 180) to an evidentiary database.

As another example, the one or more actions to be executed by the workflow server may include providing, to one or more communication devices respectively operated by the one or more persons, an electronic notification requesting the one or more persons (e.g., officer 430) to enroll in a training program related to preventing contamination of evidentiary items during processing of future incident scenes. As another example, the one or more actions to be executed by the workflow server may include reprogramming virtual assistant devices (e.g., implemented in portable radios) operated by the one or more persons to provide a visual or audio indication (e.g., via a display or speaker) to the one or more persons to not move one or more evidentiary items (e.g., based on evidentiary items moved by the person while processing incident scenes in the past) detected during processing of future incident scenes. As another example, the one or more actions to be executed by the workflow server may include requesting the radio system 150 to activate location tracking at one or more communication devices (e.g., portable radios) respectively operated by the one or more persons for a predefined future time period.

The workflow actions are not limited to the above examples and may include any other action required to adequately monitor or train public-safety officers with a goal to prevent contamination of incident scenes. The workflow actions may also include updating an evidentiary database to tag particular evidentiary items (e.g., bullet 402 shown in FIGS. 4A, 4B) as possibly contaminated. The database may also be updated to include information identifying the original and modified states of the contaminated evidentiary items. In one embodiment, the existing workflow may include an action to automatically delete images captured corresponding to the incident scene 180 after a predefined retention period. In this embodiment, the electronic computing device 110 may generate, in response to detecting contamination of the incident scene 180, a modified workflow action to extend the retention period for certain images (e.g., first and second images) that identify the original and modified states of one or more evidentiary items detected at the incident scene 180. Similarly, when the electronic computing device 110 determines, from a comparison of the first image with the second image, that there is no change of state with respect to any of the evidentiary items present at the incident scene 180, the electronic computing device 110 may shorten (or alternatively not extend) the retention period for images with redundant information. Alternatively, in this case, the electronic computing device 110 may retain only one image (e.g., based on criteria such as quality, resolution etc.) selected from the first and second images and delete the other image for optimizing storage space available for storing the images recorded by the video surveillance system 130.

At block 380, the electronic computing device 110 provides an electronic notification including the workflow modification for execution by a workflow server 120. The workflow server 120 then executes the one or more actions included in the workflow modification by coordinating with one or more of the electronic computing device 110, video surveillance system 130, access control system 140, radio system 150, and incident information system 160.

As should be apparent from this detailed description, the operations and functions of the computing devices described herein are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for modifying workflows associated with processing an incident scene in response to detecting contamination of the incident scene, the method comprising:
   receiving, at an electronic computing device, from a first camera, a first image captured corresponding to the incident scene at a first point in time;
   analyzing, at the electronic computing device, the first image using an electronic processor executing a video analysis engine stored in a memory of the electronic computing device, the video analysis engine being programmed with a recognition classifier to evaluate the first image and detect a state of one or more evidentiary items present at the incident scene;
   receiving, at the electronic computing device, from the first camera or a second camera, a second image captured corresponding to the incident scene at a second point in time;
   comparing, at the electronic computing device, the first image with the second image using the electronic processor executing the video analysis engine;
   detecting, at the electronic computing device, using the electronic processor executing the video analysis engine, a change in the state of the one or more evidentiary items based on the comparison of the first image with the second image, wherein the change in the state comprises a change in position, a change in shape, a change in color, a change in orientation, or change in presence or absence of the one or more evidentiary items;
   determining, at the electronic computing device, in response to detecting the change in the state of the one or more evidentiary items, whether one or more persons entered or exited the incident scene during a time period between the first point in time and the second point in time;
   detecting, at the electronic computing device, that the incident scene has been contaminated when it is determined that one or more persons entered or exited the incident scene during the time period between the first point in time and the second point in time;
   generating, at the electronic computing device, in response to detecting that the incident scene has been contaminated, a workflow modification identifying one or more actions to be added to an existing workflow associated with processing the incident scene, wherein the one or more actions include generating an action command for an access control system configured to restrict the one or more persons from further accessing an entry or exit point at the incident scene;
   providing, at the electronic computing device, an electronic notification including the workflow modification for execution by a workflow server; and
   automatically executing the one or more actions included in the workflow modification at the workflow server in response to receiving the electronic notification at the workflow server, the executing comprises transmitting the action command from the workflow server to the access control system, wherein the access control system physically restricts access to the entry or exit point at the incident scene in response to the transmitted action command.

2. The method of claim 1, wherein the one or more persons are identified as officers assigned to process the incident scene and further wherein the one or more actions to be executed by the workflow server include:
   providing, to one or more communication devices respectively operated by one or more supervisors of the one or more persons, an electronic notification indicating the contamination of the incident scene and further identifying the one or more persons as likely responsible for the contamination of the incident scene.

3. The method of claim 2, wherein the electronic notification provided to the one or more communication devices respectively operated by the one or more supervisors further includes a request for approval from the one or more supervisors to obtain a statement from the one or more persons in connection with the detected contamination of the incident scene.

4. The method of claim 1, wherein the one or more persons are identified as officers assigned to process the incident scene and further wherein the one or more actions to be executed by the workflow server include:
   providing, to one or more communication devices respectively operated by the one or more persons, an electronic notification requesting the one or more persons to enroll in a training program related to preventing contamination during processing of future incident scenes.

5. The method of claim 1, wherein the one or more persons are identified as officers assigned to process evidentiary items at the incident scene and further wherein the one or more actions include:
   providing, to one or more communication devices respectively operated by the one or more persons, an electronic notification requesting the identified one or more persons to provide a statement in connection with the detected contamination of the incident scene.

6. The method of claim 1, wherein the one or more persons are identified as officers assigned to process evidentiary items at the incident scene and further wherein the one or more actions include:
   reprogramming virtual assistant devices respectively operated by the one or more persons to provide a visual or audio indication to the one or more persons to not move one or more evidentiary items detected during processing of future incident scenes.

7. The method of claim 1, wherein the one or more persons are identified as officers assigned to process evidentiary items at the incident scene and further wherein the one or more actions include:
activating location tracking at one or more communication devices respectively operated by the one or more persons for a predefined time period.

8. The method of claim 1, further comprising:
determining an identity of the one or more persons determined to have entered or exited the incident scene during the time period between the first point in time and the second point in time;
determining, based on the identity of the one or more persons, a role respectively assigned to the one or more persons in connection with processing the incident scene; and
determining that the role does not require the one or more persons to interact with the one or more evidentiary items at the incident scene, and responsively determining that the incident scene has been likely contaminated by the one or more persons.

9. The method of claim 1, wherein the first image is captured with a first body-worn camera operated by a first officer assigned to process the incident scene.

10. The method of claim 9, wherein the second image is captured with a second body-worn camera operated by a second officer assigned to process the incident scene.

11. The method of claim 10, wherein the one or more persons are associated with one or more agencies different from one or more agencies of the first officer or the second officer.

12. The method of claim 1, further comprising:
capturing a third image with a camera deployed outside the incident scene at a third point in time, the third point in time preceding the second point in time and further succeeding the first point in time; and
determining that the one or more persons have entered or exited the incident scene during the time period between the first point in time and the second point in time based on an analysis of the third image captured at the third point in time.

13. The method of claim 1, wherein the workflow server is implemented at the electronic computing device for updating the workflow modification in the existing workflow and further executing the one or more actions included in the workflow modification.

14. The method of claim 1, wherein the one or more actions included in the workflow modification further include: generating, at the electronic computing device, a camera control command for a video surveillance system, and wherein the automatically executing of the one or more actions at the workflow server comprises transmitting the camera control command from the workflow server to the video surveillance system, wherein the video surveillance system automatically changes a field-of-view of one or more cameras including the first camera or the second camera deployed at the incident scene in response to the transmitted camera control command.

15. An electronic computing device, comprising:
a communications unit;
an electronic processor communicatively coupled to the communications unit, the electronic processor configured to:
receive, via the communications unit, from a first camera, a first image captured corresponding to an incident scene at a first point in time;
analyze the first image by executing a video analysis engine stored in a memory of the electronic computing device, the video analytics engine being programmed with a recognition classifier to evaluate the first image and detect a state of one or more evidentiary items present at the incident scene;
receive, via the communications unit, from the first camera or a second camera, a second image captured corresponding to the incident scene at a second point in time;
compare the first image with the second image by executing the video analysis engine,
detect a change in the state of the one or more evidentiary items based on the comparison of the first image with the second image, wherein the change in the state comprises a change in position, a change in shape, a change in color, a change in orientation, or change in presence or absence of the one or more evidentiary items;
determine, in response to detecting the change in the state of the one or more evidentiary items, whether one or more persons entered or exited the incident scene during a time period between the first point in time and the second point in time;
detect, at the electronic computing device, that the incident scene has been contaminated when it is determined that one or more persons entered or exited the incident scene during the time period between the first point in time and the second point in time;
generate, in response to detecting that the incident scene has been contaminated, a workflow modification identifying one or more actions to be added to an existing workflow associated with processing the incident scene, wherein the one or more actions include generating an action command for an access control system configured to restrict the one or more persons from further accessing an entry or exit point at the incident scene; and
provide an electronic notification including the workflow modification for the automatic execution of the one or more actions at a workflow server, the automatic execution comprising the transmission of the action command from the workflow server to the access control system, wherein the access control system is configured to physically restrict access to the entry or exit point at the incident scene in response to the transmitted action command.

16. The electronic computing device of claim 15, wherein the electronic processor is configured to:
determine an identity of the one or more persons determined to have entered or exited the incident scene during the time period between the first point in time and the second point in time;
determine, based on the identity of the one or more persons, a role respectively assigned to the one or more persons in connection with processing the incident scene; and
determine that the role does not require the one or more persons to interact with the one or more evidentiary items at the incident scene, and responsively determine that the incident scene has been likely contaminated by the one or more persons.

17. The electronic computing device of claim 15, wherein the first image is captured with a first body-worn camera operated by a first officer assigned to process the incident scene.

18. The electronic computing device of claim 17, wherein the second image is captured with a second body-worn camera operated by a second officer assigned to process the incident scene.

19. The electronic computing device of claim 18, wherein the one or more persons are associated with one or more agencies different from one or more agencies of the first officer or the second officer.

20. The electronic computing device of claim 15, wherein the workflow server is implemented at the electronic computing device for updating the workflow modification in the existing workflow and further executing the one or more actions included in the workflow modification.

\* \* \* \* \*